United States Patent [19]

Small, Jr.

[11] 4,206,354
[45] Jun. 3, 1980

[54] AXIAL MATRIX DEWAR

[75] Inventor: W. Harold Small, Jr., Nashua, N.H.

[73] Assignee: Honeywell Inc., Minneapolis, Minn.

[21] Appl. No.: 863,752

[22] Filed: Dec. 23, 1977

Related U.S. Application Data

[63] Continuation of Ser. No. 703,731, Jul. 9, 1976, abandoned.

[51] Int. Cl.² .............................................. G01J 1/00
[52] U.S. Cl. .................................... 250/349; 29/856; 250/352
[58] Field of Search ................. 29/628; 250/345, 349, 250/352

[56] References Cited

U.S. PATENT DOCUMENTS

| | | | |
|---|---|---|---|
| 3,185,842 | 5/1965 | Johnson | 250/352 |
| 3,719,990 | 3/1973 | Long et al. | 29/468 |
| 4,005,288 | 1/1977 | Robillard | 250/352 |
| 4,059,764 | 11/1977 | Belasco et al. | 250/352 |

Primary Examiner—Harold A. Dixon
Attorney, Agent, or Firm—Theodore F. Neils; David R. Fairbairn

[57] ABSTRACT

An improved Dewar assembly for infrared detectors is disclosed. Vacuum tight feed-throughs are partially embedded in the inner flask with exposed portions on both sides of a vacuum seal.

38 Claims, 17 Drawing Figures

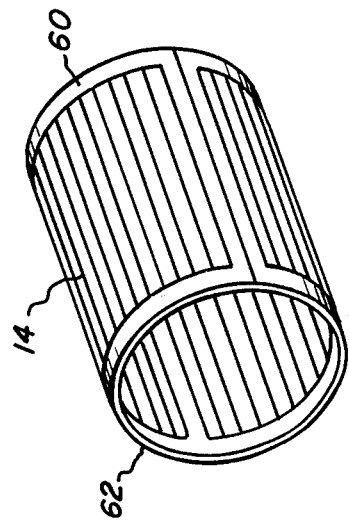
FIG. 4B
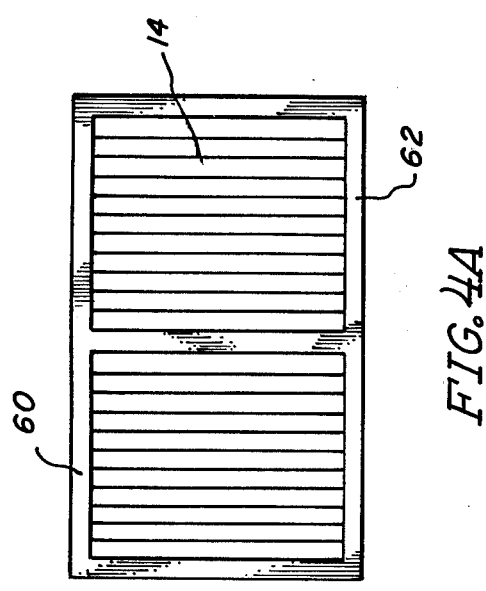
FIG. 4A
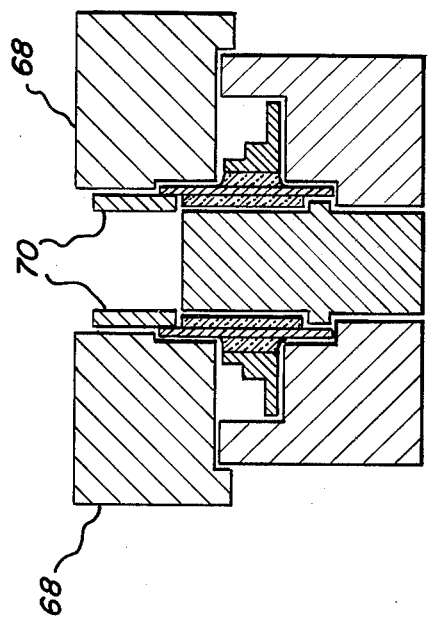
FIG. 4E
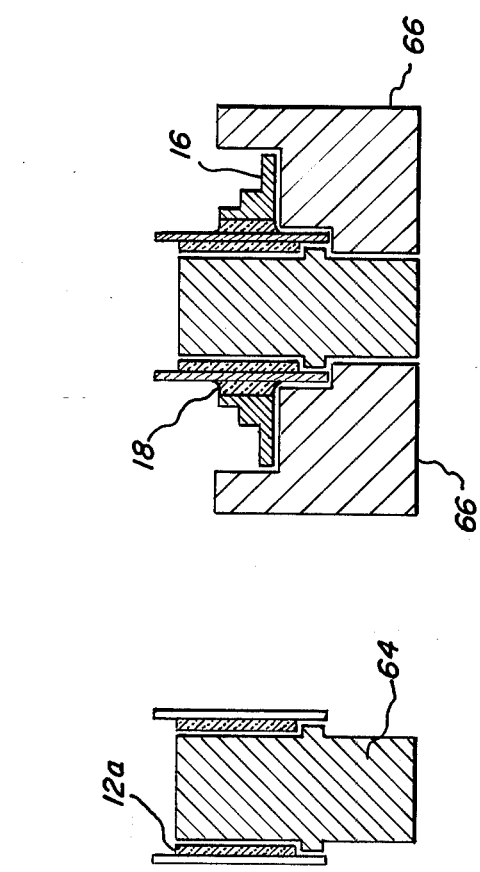
FIG. 4D
FIG. 4C

AXIAL MATRIX DEWAR

This is a continuation of application Ser. No. 703,731, filed July 9, 1976, now abandoned.

BACKGROUND OF THE INVENTION

This invention relates to photodetector mounting assemblies. In particular, the present invention is an improved construction and process for construction of infrared detector mounting assemblies of the Dewar type.

Infrared photodetectors are operated at low temperatures in order to obtain improved detector performance. The detectors are typically mounted in a double flask of the Dewar type. A Dewar flask consists of an inner flask and an outer flask. The infrared detectors are mounted in thermal contact with the top surface of the inner flask, which is cryogenically cooled. The detectors, therefore, operate at the cryogenic temperature.

Since the Dewar typically maintains a vacuum environment around the detectors, electrical connection between the detectors in the evacuated portion of the Dewar and outside of the Dewar has been rather complex. Fabrication techniques used to mount the detectors in the Dewar and to provide electrical connection from the detectors to the outside of the Dewar typically have involved a large number of hand or manual fabrication steps. These manual fabrication steps are time-consuming, tedious, expensive, and generally unsatisfactory.

One particularly difficult problem has been the providing of vacuum tight feed-throughs from the evacuated portion of the Dewar to the outside or non-evacuated portion of the Dewar. The problem becomes particularly difficult when large numbers of detectors are mounted in the Dewar. For example, many present applications require more than 100 feed-throughs. Separate handling, holding, and fusing of feed-throughs on an individual basis becomes prohibitive.

In the past, some improved techniques for fabricating feed-throughs in a Dewar have been suggested, such as the method described in U.S. Pat. No. 3,719,990 by J. J. Long et al. In this method, vacuum feed-throughs are inserted through the side walls of the outer flask of the Dewar. The feed-throughs are in the form of a plurality of conductive strips which are mounted in spoke-like orientation on an outer supporting rim. A somewhat similar arrangement of feed-throughs is shown in U.S. Pat. No. 3,851,173 by C. O. Taylor et al.

SUMMARY OF THE INVENTION

The present invention provides improved vacuum feed-throughs for infrared detector mounting assemblies of the Dewar type. A plurality of feed-throughs are partially embedded in the inner flask with an essentially axial alignment. A vacuum seal is made between the inner flask and first mounting means. The plurality of feed-throughs are exposed at both sides of the vacuum seal. The outer flask is attached to the first mounting means and a second vacuum seal is formed between the outer flask and the first mounting means.

BRIEF DESCRIPTION OF THE DRAWINGS

FIGS. 4A–4I show the fabrication of an inner flask in accordance with the present invention.

DETAILED DESCRIPTION OF THE PREFERRED EMBODIMENTS

The present invention will be referred to as an "axial matrix Dewar" because the vacuum feed-throughs are a plurality of axially aligned electrical conductors which are partially embedded in the inner flask with exposed portions on both sides of the vacuum seal. This configuration can be readily fabricated on a production basis with a minimum of hand or manual operations. The resulting Dewar structure is particularly amenable to large scale production.

Figures 1A, 2:
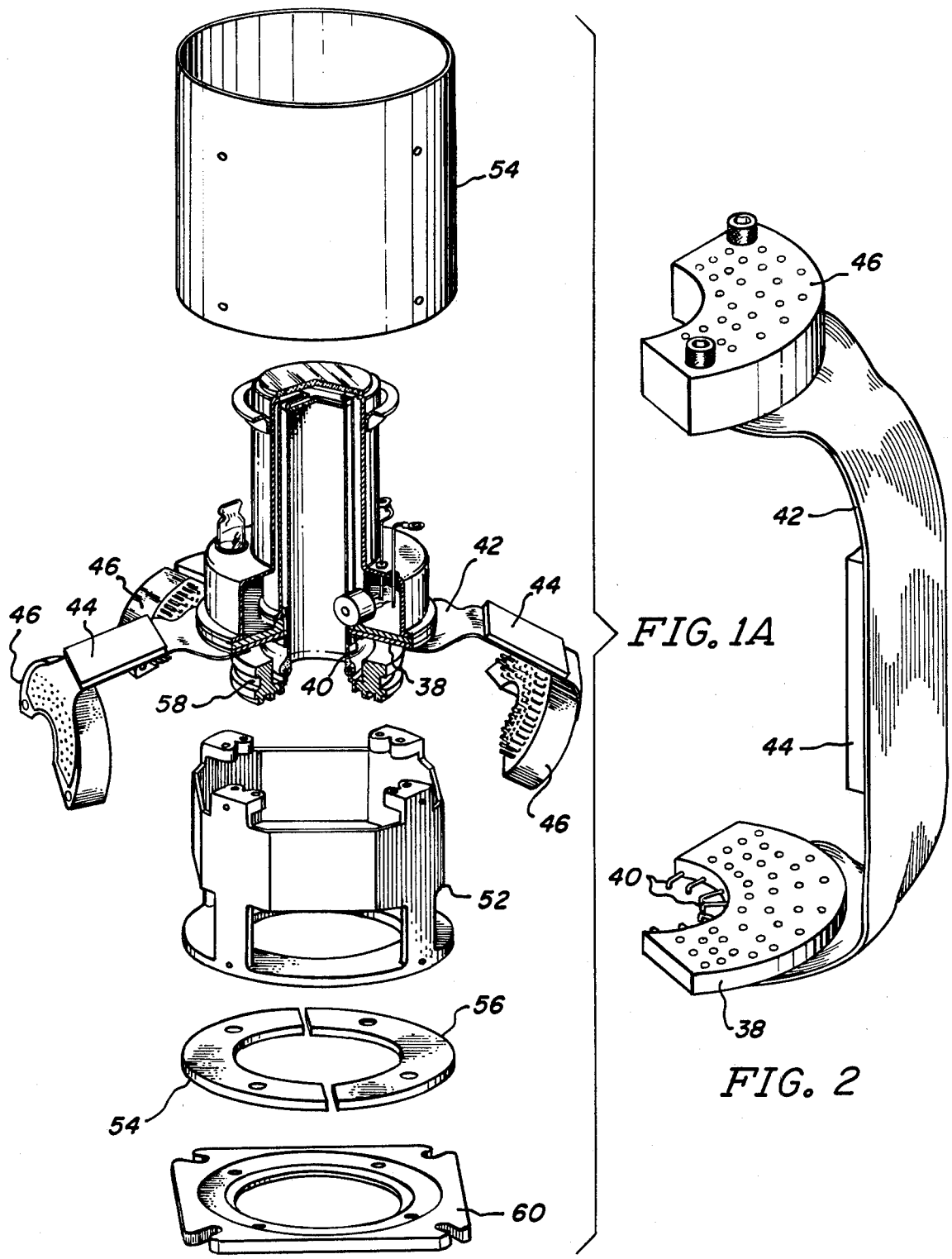
FIG. 1A shows an exploded view of the Dewar of the present invention.
FIG. 2 shows the connectors used to make interconnection with the feed-throughs in the non-evacuated portion of the Dewar assembly.
Figure 1C:
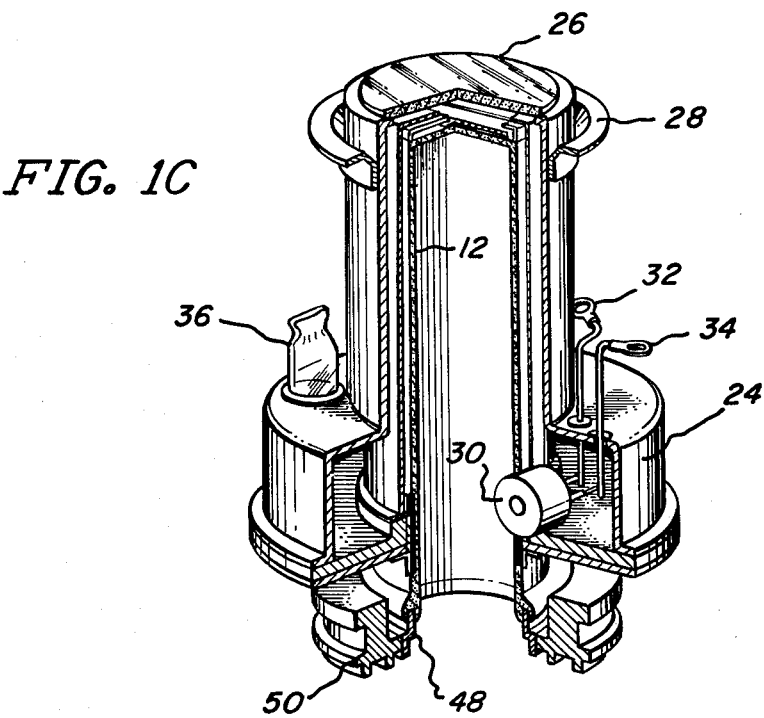
FIG. 1C shows a partial cutaway view of a portion of the Dewar of FIGS. 1A and 1B.
Figure 1B:
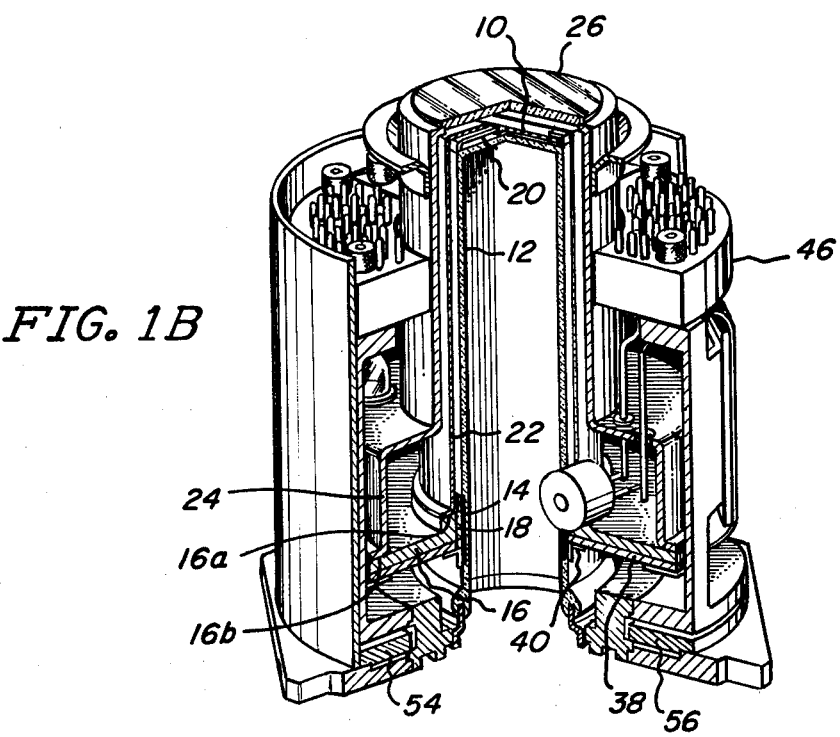
FIG. 1B shows a partial cutaway view of the assembled Dewar of FIG. 1A.

FIG. 1A shows an exploded view of the axial matrix Dewar of the present invention. FIG. 1B shows a partial cutaway view of the assembled axial matrix Dewar, and FIG. 1C shows a similar view with some parts removed for easier viewing.

The axial matrix Dewar includes a detector array 10 mounted on the end of inner flask 12. Thin film leads extend from the end surface of inner flask 12 down the side of inner flask 12. These leads interconnect with the axial matrix assembly, which comprises a plurality of metal feed-throughs 14 which are axially aligned and partially embedded in the side surface of inner flask 12. A first mounting means 16 is attached to inner flask 12 at the location of feed-throughs 14. First mounting means 16 is preferably a metal flange such as Kovar which is bonded to inner flask 12 by a glass-to-metal vacuum seal 18. The metal feed-throughs are exposed on both sides of the vacuum seal 18.

Above the detector array 10 and covering the entire top of inner flask 12, including the thin film leads, is a cold shield 20. Cold shield 20 is preferably black on the inside and gold on the outside, with a slot above the array which is sized to conform to the desired field of view. Since cold shield 20 is in thermal contact with inner flask 12, it is maintained at the cryogenic operating temperature of the Dewar.

Mounted to the first mounting means at a first abutment 16a is a radiation shield 22. This radiation shield 22, which is preferably stainless steel, is concentrically arranged with inner flask 12. The top of radiation shield 22 includes an opening over the detector array which is sized to conform to the desired field of view. The finish on radiation shield 22 is preferably gold, both inside and outside.

Surrounding radiation shield 22 and forming the outer vessel of the vacuum portion of the Dewar is outer flask 24. In the preferred embodiments, outer flask 24 is a metal such as Kovar which is vacuum sealed to mounting flange 16 at second abutment 16b. The vacuum seal between mounting means 16 and outer flask 24 preferably is formed by welding. A germanium window 26 is soldered to the top of outer flask 24 to permit infrared radiation to impinge upon detector array 10. Near the top of outer flask 24 is a flange 28 to which an exterior cold shield (not shown) may be mounted.

Within the evacuated portion of the Dewar is a getter 30. Lead feed-throughs 32 and 34 extend from the getter 30 to the non-evacuated portion of the Dewar. Also shown is a vacuum pinch-off tube 36.

As described previously, electrical connection is provided between feed-throughs 14 and the detector elements of detector array 10 by thin film electrical leads which extend from individual ones of feed-throughs 14 to the top of inner flask 12. Electrical connection is then made between the detectors and the thin film leads on the top surface of inner flask 12.

Electrical connection to feed-throughs 14 on the opposite (non-evacuated) side of vacuum seal 18 is provided by an electrically insulating supporting rim in which are embedded a plurality of conductors. The conductors extend from the rim in spoke-like orientation to make contact with individual ones of the plurality of feed-throughs 14. In the embodiments shown in FIGS. 1A-1C, supporting rim 38 is formed in four sections, each accommodating one-quarter of the spoke-like conductors 40 required to make contact to feed-throughs 14. Rim 38 is mounted immediately beneath mounting means 16. FIG. 2 shows another view of supporting rim 38 and conductors 40.

In one preferred embodiment, supporting rim 38 is attached to mounting means 16 by epoxy. The plurality of conductors 40 are each aligned with one of the feed-throughs 14. The conductors 40 are preferably beryllium copper fingers shaped in the form of an "L". The fingers are welded to feed-throughs 14.

A flat flexible cable 42 is attached to supporting rim 38 and makes electrical connection with conductors 40. A printed circuit resistor pack 44 is also mounted on flexible cable 42 as is a male type connector 46, which is preferably an Airborn connector. Each resistor of the printed circuit resistor pack 44 may be pretrimmed to provide a specified bias resistance associated with its detector element match.

FIG. 2 shows another view of printed circuit resistor pack 44, flexible cable 42, and male type connector 46, but with the pins of connector 46 omitted in this view to permit showing the position of both bolts used for attaching connector 46 as set out below.

Fused to the end of inner flask 12 is a metal ring 48 and an interface flange 50. A shoulder is provided for an O-ring seal between metal ring 48 and the cooler (not shown) which cools the inner flask 12. A basket assembly 52, which is used to hold connectors 46 in position is screwed to interface flange 50. Each resistor pack 44 is attached using epoxy to its respective support plate, which is part of the basket structure. The connectors are bolted to the posts of basket assembly 52, as are leads 32 and 34 from getter 30, using insulators to prevent shorting through the basket. Outer cylinder 54 is slipped over and screwed to basket assembly 52. Slip rings 54 and 56 are placed in the groove 58 provided in inner face flange 50. Index plate 60 is attached to slip rings 54 and 56 by screws.

The axial matrix Dewar has several advantages. First, the axial matrix Dewar is relatively simple to fabricate with a minimum of manual operations. Second, the axial matrix assembly preferably makes use of the highly mature technology of Corning No. 7052 glass-to-Kovar metal, which produces high reliability vacuum seals. Third, the design shown in FIGS. 1A-1C features a mechanical decoupling of all components except the vacuum cover from this glass-to-metal seal. Fourth, rotational alignment can be done without stressing the seal. The axial matrix assembly, therefore, is both simple to make and free from hazardous mechanical loading.

Figure 3C:
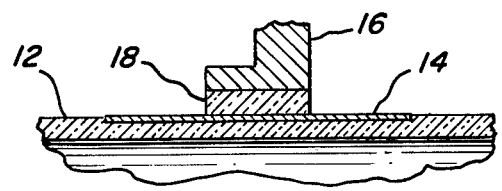
FIG. 3C shows an expanded view of a portion of the axial matrix assembly shown in FIG. 3A.
Figure 3:
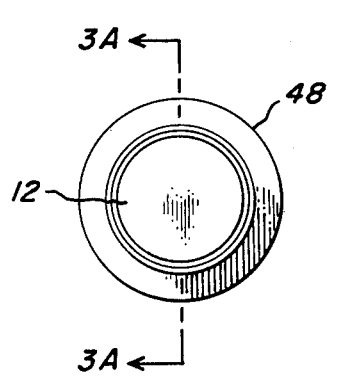
FIG. 3 shows a top view of the inner flask of the Dewar of FIGS. 1A–1C.
Figure 3A:
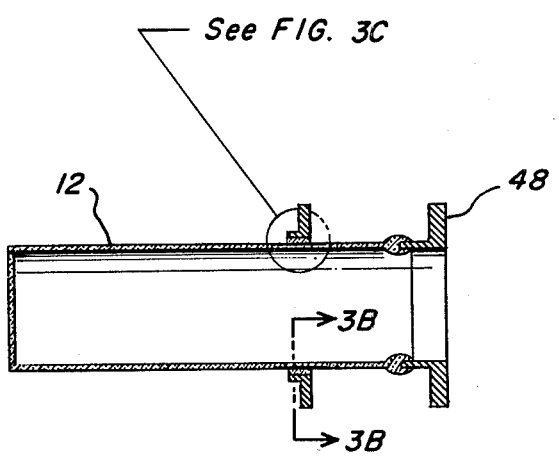
FIG. 3A shows a cross sectional side view of the inner flask of FIG. 3.
Figure 3B:
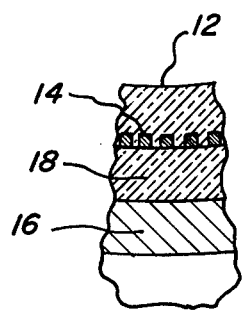
FIG. 3B is a partial cross sectional view of the axial matrix assembly shown in FIG. 3A.

A detailed description of the axial matrix assembly is shown in FIGS. 3-3C. As shown in these Figures, the feed-throughs 14 are partially embedded in the side wall of inner flask 12. In one preferred embodiment of the present invention, feed-throughs 14 are Kovar conductors having a square cross section of about 5 mils on a side.

The axial matrix assembly shown in FIGS. 3-3C may be fabricated by a number of methods, including molding, flame spraying, and vacuum shrinking or expanding. A particularly advantageous method of forming the axial matrix assembly is shown in FIGS. 4A-4I. This method uses glass molding.

In FIG. 4A, a metal screen is shown. The screen includes two supporting rims 60 and 62 and a plurality of wires extending between the supporting rims 60 and 62. These wires will form feed-throughs 14 in the axial matrix assembly.

In one successful embodiment, the screen is Kovar having a thickness of about 5 mils and having 220 five mil wide wires extending between the support rims 60 and 62. The wires are formed by standard photoprocessing techniques.

The screen is then formed into a cylinder (squirrel cage) on a mandrel and spot welded. The resulting squirrel cage is shown in FIG. 4B.

FIGS. 4C-4E show the mold assembly sequence used to form the vacuum seal and to embed the feed-throughs in the side wall of the inner flask. Molds 64, 66, 68, and 70 are graphite molds. Two carefully sized cylinders 12a and 18 of a moldable material (preferably glass) are positioned concentrically in the mold with the squirrel cage positioned between the two cylinders. Mounting flange 16 surrounds glass cylinder 18.

When the mold has been assembled as shown in FIG. 4E, the entire assembly is then heated. The heat is preferably provided using an induction heater. The RF energy from the induction heater provides heat by coupling to the low resistivity mold and to the metal parts. The glass is heated by contact with the mold and the metal parts. As heating occurs, glass flows in around the individual wires of the squirrel cage, wetting them all over in the region inside the mounting flange 16 and thus assuring a good vacuum seal.

Figures 4F, 4G:
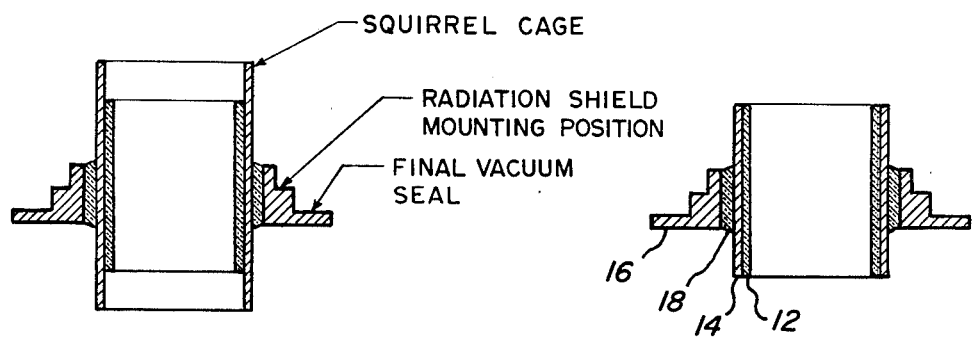

The mold is then cooled and the rough axial matrix assembly is removed, as shown in FIG. 4E. Since all of the individual wires are connected together by the supporting rims 60 and 62, these supporting rims must be cut off as shown in FIG. 4G.

Figures 4H, 4I:
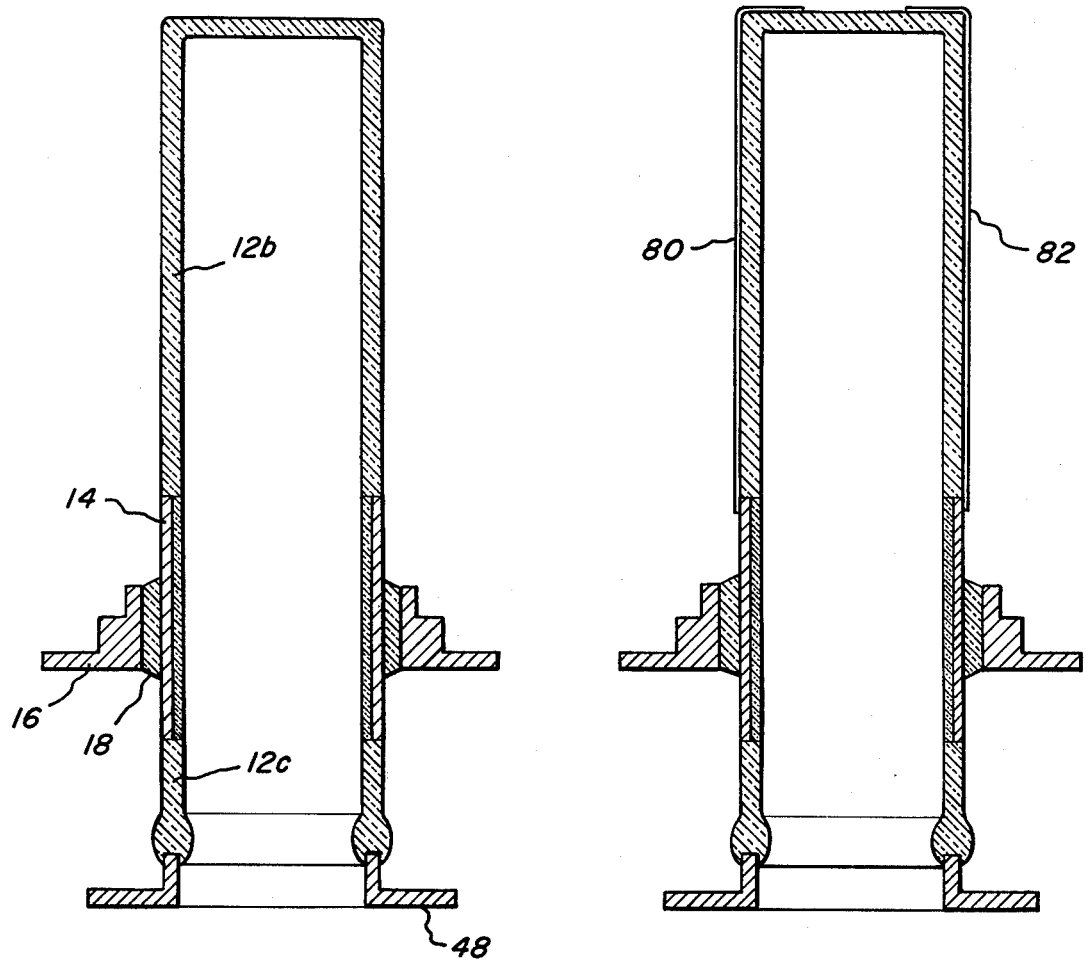

FIG. 4H shows the inner flask after glass portions 12b and 12c have been attached to the axial matrix assembly. Mounting flange 48 is also attached to the inner flask during the process. The attachment of portions 12b and 12c is performed by standard glass attachment techniques.

In the preferred embodiments of the present invention, the interconnection between feed-throughs 14 and the infrared detectors is provided by thin film conductors deposited on the side and top surfaces of portion 12b of the inner flask. One method of providing these electrical connections is described in U.S. patent application Ser. No. 614,805 by Gene A. Robillard, which is assigned to the same assignee as the present application and has been abanoned. In this process, the portion 12b is metal plated by sputtering or ion plating. Portions of the plating are then selectively removed by photoprocessing to result in individual conductors which contact feed-throughs 14 and extend up the side surface of portion 12b to the top surface.

When this process is used, portion 12b is typically ground to provide a precision outside diameter for the photo-processing. A thin metal film is then deposited on the top and side surfaces of portion 12b of the inner flask. This metal film overlaps onto feed-throughs 14. Photoprocessing is used to selectively remove the material.

The photoprocessing may be performed in a number of different ways. One particularly advantageous method is a two step process where the curved side surface is processed separately from the flat end. A flexible mask is wrapped around the curved side surface of the inner flask in contact with a photoresist which covers the deposited metal. The advantage of this technique is simplicity. Since the inner flask is metal plated (and, therefore, opaque) and since the mask (dark side in) is in contact with the photoresist, directionality of elimination is not important. No sophisticated fixtures and tooling, therefore, are necessary to accomplish exposure of the photoresist. In addition, since only one exposure is required, the process can be accomplished quickly with less handling and at lower cost.

After exposure, the exposed photoresist is washed away. The metalization is then etched away, and the inner flask is then ready for photoprocessing of the end surface.

End surface photoprocessing is done similarly, with a contact mask put down on the end surface. A single exposure can be used, followed by rinsing, etching, and clean-up. FIG. 4I shows the resulting structure with plated leads 80 and 82 extending from the vacuum feed-throughs 14 up the side surface and onto the end surface of the inner flask. Connection of the detectors of the detector array to individual leads on the end surface of the inner flask may be performed by a number of well known techniques.

In conclusion, the axial matrix Dewar is particularly amenable to large scale production because it requires a minimum of manual fabrication steps. The axial matrix Dewar features easily fabricated and highly reliable vacuum feed-throughs which can be fabricated on an automatic or semiautomatic basis. The advantages of the axial matrix become particularly important when a very large number of vacuum feed-throughs must be provided.

The present invention has been described with reference to a series of preferred embodiments, but workers skilled in the art will recognize that changes may be made in form and detail without departing from the spirit and scope of the invention.

The embodiments of the invention in which an exclusive property or right is claimed are defined as follows:

1. An infrared detector mounting assembly comprising:
   an electrical insulating inner flask having an end surface at a first end of the inner flask;
   an outer flask;
   a first mounting means for attachment of the inner and outer flasks;
   an electrically insulating bonding means bonding the first mounting means to the electrically insulating inner flask;
   a plurality of conductive members each electrically isolated from one another and each partially embedded in the electrically insulating inner flask, each of the plurality of conductive members being exposed at opposite sides of the electrically insulating bonding means;
   an infrared detector means mounted on the end surface;
   a plurality of electrically conductive paths provided between the detector means and the plurality of conductive members were exposed on one side of the electrically insulating bonding means; and
   a connector means electrically connected to the plurality of conductive members where exposed on the opposite side of the electrically insulating bonding means.

2. The invention of claim 1 wherein the inner flask and the outer flask are concentrically arranged.

3. The invention of claim 2 wherein the first mounting means includes first and second concentrically arranged abutments, wherein the second abutment is closer to the inner flask than the first abutment.

4. The invention of claim 3 wherein the outer flask is mounted to the first mounting means proximate the first abutment.

5. The invention of claim 4 and further comprising:
   a radiation shield concentrically positioned between the inner flask and the outer flask, the radiation shield being mounted to the first mounting means proximate the second abutment.

6. The invention of claim 5 wherein the radiation shield has an opening therein defining a field of view for the detector means.

7. The invention of claim 1 wherein the electrically insulating inner flask is a glass.

8. The invention of claim 7 wherein the plurality of conductive members are metal.

9. The invention of claim 8 wherein the electrically insulating bonding means comprises a glass.

10. The invention of claim 9 wherein the first mounting means comprises a metal flange.

11. The invention of claim 10 wherein the plurality of conductive members and the first mounting means are Kovar.

12. The invention of claim 1 and further comprising second mounting means attached to the inner flask at a second end opposite the first end.

13. The invention of claim 1 wherein the connector means comprises:
   electrically insulating supporting rim means; and
   a plurality of conductors extending from the electrically insulating rim means in spoke-like orientation to make electrical contact with individual ones of the plurality of conductive strips.

14. The invention of claim 13 wherein the electrically insulating supporting rim means is attached to the first mounting means.

15. The invention of claim 1 wherein the plurality of electrically conductive paths comprise metallic electrical conductive paths on a surface portion of the inner flask and in electrical contact with the plurality of conductive members, the plurality of conductive members being substantially aligned with an axis of the inner flask passing through the end surface thereof.

16. The invention of claim 15 wherein the plurality of conductive paths extend from the surface portion onto the end surface of the inner flask.

17. The invention of claim 16 and further comprising conductor means connecting the conductive paths on the end surface to the detector means.

18. A photodetector means mounting assembly comprising:
- an electrically insulating inner flask for a Dewar assembly having a wall structure with this wall structure having a wall surface portion;
- a first mounting means;
- a first vacuum seal means capable of maintaining a substantial vacuum on one side thereof in the presence of a gas on the other, this first vacuum seal means occurring between the inner flask and the first mounting means at the wall surface portion of the inner flask; and
- a plurality of spaced apart electrically conductive feed-throughs each partially embedded in the wall structure of the inner flask, these feed-throughs each being exposed through the wall surface portion on each side of the first vacuum seal means to provide electrical connection locations at the exposed positions on each of these feed-throughs.

19. The invention of claim 18 wherein the inner flask has an outer flask concentrically arranged about it with the outer flask attached to the first mounting means through a second vacuum seal means occurring therebetween.

20. The invention of claim 19 wherein the first mounting means includes first and second concentrically arranged abutments, wherein the second abutment is closer to the inner flask than the first abutment.

21. The invention of claim 20 wherein the outer flask is mounted to the first mounting means proximate the first abutment.

22. The invention of claim 21 and further comprising:
- a radiation shield concentrically positioned between the inner flask and the outer flask, the radiation shield being mounted to the first mounting means proximate the second abutment.

23. The invention of claim 22 wherein the radiation shield has an opening therein defining a field of view for the photodetector means.

24. The invention of claim 18 wherein the inner flask is a glass.

25. The invention of claim 24 wherein the plurality of feed-throughs are metal.

26. The invention of claim 25 wherein the first mounting means comprises a metal flange.

27. The invention of claim 26 wherein the plurality of feed-throughs and the first mounting means are Kovar.

28. The invention of claim 18 and further comprising a photodetector means mounted at a first end of the inner flask and a second mounting means attached to the inner flask at a second and opposite end, wherein the wall structure is formed about an axis passing through the first and second ends with the feed-throughs substantially aligned with this axis.

29. The invention of claim 18 and further comprising: electrically insulating supporting rim means; and
- a plurality of conductors extending from the electrically insulating rim means in spoke-like orientation to make contacts with individual ones of the plurality of feed-throughs.

30. The invention of claim 29 wherein the electrically insulating supporting rim means is attached to the first mounting means.

31. A method of forming an infrared detector package having electrically insulating inner flask and an outer flask, the method comprising:
- embedding a plurality of electrically conductive feed-throughs in a wall of the inner flask at a side surface of the wall;
- forming a first vacuum seal means between a first mounting means and the inner flask at the side surface, the first vacuum seal covering a portion of the embedded plurality of feed-throughs, but leaving portions of the feed-throughs exposed through the side surface on both sides of the first vacuum seal; and
- attaching the outer flask to the first mounting means with a second vacuum seal.

32. A method of forming an infrared detector package having electrically insulating inner flask and an outer flask, the method comprising:
- embedding a plurality of electrically conductive feed-throughs in a wall of the inner flask at a side surface of the wall comprising:
  - providing first and second supporting rims having a plurality of feed-throughs extending therebetween;
  - providing a first portion of the inner flask;
  - positioning the first portion of the inner flask and the plurality of feed-throughs with first and second supporting rims in a mold;
  - heating the mold to fuse the first portion of the inner flask and the feed-throughs;
  - detaching the first and second supporting rims from the feed-throughs after the fusing; and
  - bonding a second portion of the inner flask to the first portion; and
- forming a first vacuum seal means between a first mounting means and the inner flask at the side surface, the first vacuum seal covering a portion of the embedded plurality of feed-throughs, but leaving portions of the feed-throughs exposed through the side surface on both sides of the first vacuum seal.

33. A process of fabricating vacuum tight feed-throughs in a Dewar mounting comprising:
- providing, in a mold, in essentially concentric arrangement, a first cylinder of moldable material, first and second supporting rims having a plurality of feed-throughs extending between the first and second supporting rims, a second cylinder of moldable material around the first cylinder and the feed-throughs;
- heating the mold to fuse the feed-throughs between the first and second cylinders; and
- detaching the first and second supporting rims.

34. The process of claim 33 and further comprising: providing, in the mold, a mounting flange around the second cylinder.

35. The process of claim 34 wherein heating the mold fuses the mounting flange to the second cylinder.

36. The process of claim 35 wherein the mounting flange is metal.

37. The process of claim 33 wherein the moldable material is glass.

38. The process of claim 33 and further comprising: bonding an additional glass portion to the first glass cylinder to form an inner flask of the Dewar mounting.

* * * * *